United States Patent
Sawaya et al.

(10) Patent No.: US 7,289,811 B2
(45) Date of Patent: Oct. 30, 2007

(54) METHOD AND SYSTEM FOR COVERAGE PREDICTION IN WIRELESS NETWORKS

(75) Inventors: Samir A. Sawaya, San Diego, CA (US); Amir Bigloo, Brampton (CA); Weinan Zhang, Scarborough (CA); Steve Swallow, Carrollton, TX (US)

(73) Assignee: Motorola, Inc., Schaumburg, IL (US)

( * ) Notice: Subject to any disclaimer, the term of this patent is extended or adjusted under 35 U.S.C. 154(b) by 368 days.

(21) Appl. No.: 11/114,424

(22) Filed: Apr. 26, 2005

(65) Prior Publication Data

US 2006/0240834 A1    Oct. 26, 2006

(51) Int. Cl.
*H04Q 7/20* (2006.01)

(52) U.S. Cl. .............. 455/446; 455/450; 455/452.1; 455/452.2; 455/453

(58) Field of Classification Search .......... 455/446, 455/450, 452.1, 452.2, 453, 422.1
See application file for complete search history.

(56) References Cited

U.S. PATENT DOCUMENTS

| | | | |
|---|---|---|---|
| 5,754,959 A * | 5/1998 | Ueno et al. ............ 455/453 |
| 6,473,038 B2 * | 10/2002 | Patwari et al. ........... 342/450 |
| 7,123,918 B1 * | 10/2006 | Goodman ............... 455/446 |
| 7,149,477 B2 * | 12/2006 | Ogami ................. 455/67.11 |
| 2004/0185863 A1 * | 9/2004 | Ogami .................. 455/452.1 |
| 2004/0229623 A1 * | 11/2004 | Rappaport et al. ........ 455/446 |
| 2006/0105815 A1 * | 5/2006 | Jendbro et al. ........... 455/566 |

\* cited by examiner

*Primary Examiner*—Joseph Feild
*Assistant Examiner*—Huy D Nguyen
(74) *Attorney, Agent, or Firm*—Indira Saladi; Kenneth D. Labudda (57) ABSTRACT

A method and system for estimating the number of transceivers in a service area (100) are disclosed. A calibration area (102) is selected from the service area, and a defined number of transceivers are placed in the calibration area. Input parameters are determined for the defined number of transceivers, which are refined so as to ensure that the input parameters satisfy a customer-specified requirement. The measured input parameters for the refined number of transceivers are used to calibrate a Radio Frequency (RF) coverage prediction tool for the calibration area. The calibrated RF coverage prediction tool is further used to estimate the number of transceivers in the service area.

17 Claims, 10 Drawing Sheets

METHOD AND SYSTEM FOR COVERAGE PREDICTION IN WIRELESS NETWORKS

FIELD OF THE INVENTION

This invention relates in general to the field of wireless communication networks, and more specifically to an estimation of the number of transceivers in a service area.

BACKGROUND OF THE INVENTION

With the increase in the need for communication, wireless communication networks have found wide applicability. Planning a wireless communication network requires an estimation of parameters, including the number of transceivers, their location, and their coverage area in a corresponding service area. An accurate estimation of the parameters is important for sizing a bid for pre-sale activity and effective post-sale deployment of the transceivers. It is therefore essential to accurately estimate the number of transceivers required, to provide required coverage in a service area, and their respective locations.

Currently, there are various methods available that address the problem of estimating the number of transceivers in a service area. The accuracy of these methods in estimating the number of transceivers depends on accurate determination of input parameters. Input parameters may include a coverage area and a path loss of a transceiver in the service area. Various tools are used to determine these input parameters. For example, a ray-tracing algorithm determines the coverage area of transceivers and this algorithm is particularly appropriate in urban environments. The ray-tracing algorithm makes use of multiple reflections and diffractions of radio frequency waves to determine a scattered field. The coverage area of a transceiver is then determined based on the scattered field.

However, one or more of the available methods and tools suffer from the disadvantage of complexity. Implementing the available methods and tools entails complex operations. Despite the complexity, the available methods are extremely time consuming in estimating the number of transceivers.

In addition, the methods and tools available for the purpose are expensive. The preferred practice involves carrying out an estimation of the parameters for some typical areas only. To counter the high costs involved, wireless communication industries generalize and apply results to other areas. However, this approach does not guarantee accuracy in estimating the parameters.

BRIEF DESCRIPTION OF THE DRAWINGS

The present invention is illustrated by way of example, and not limitation, in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE EMBODIMENTS

Various embodiments of the present invention provide a method and system for estimating the number of transceivers in a service area. A calibration area is selected from the service area and a defined number of transceivers are placed in the calibration area. Input parameters are determined for the defined number of transceivers and matched against a customer specified requirement. The percentage of the calibration area is determined for which measured input parameters reach the customer specified requirement. The percentage of the calibration area is matched against a pre-defined coverage percentage. The defined number of transceivers is refined so as to make the percentage of the calibration area reach the pre-defined coverage percentage. The determined input parameters of the refined number of transceivers are used to calibrate a Radio Frequency (RF) coverage prediction tool for the calibration area. The calibrated RF coverage prediction tool is then used to estimate the number of transceivers in the service area.

Before describing in detail the particular method and the system for estimating the number of transceivers in the service area in accordance with the present invention, it should be observed that the present invention resides primarily in combinations of method steps and apparatus components related to the method and the system for estimating the number of transceivers in the service area. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

A "set" as used in this document, means a non-empty set (i.e., comprising at least one member). The term "another", as used herein, is defined as at least a second or more. The terms "including" and/or "having", as used herein, are defined as comprising.

Figure 1:
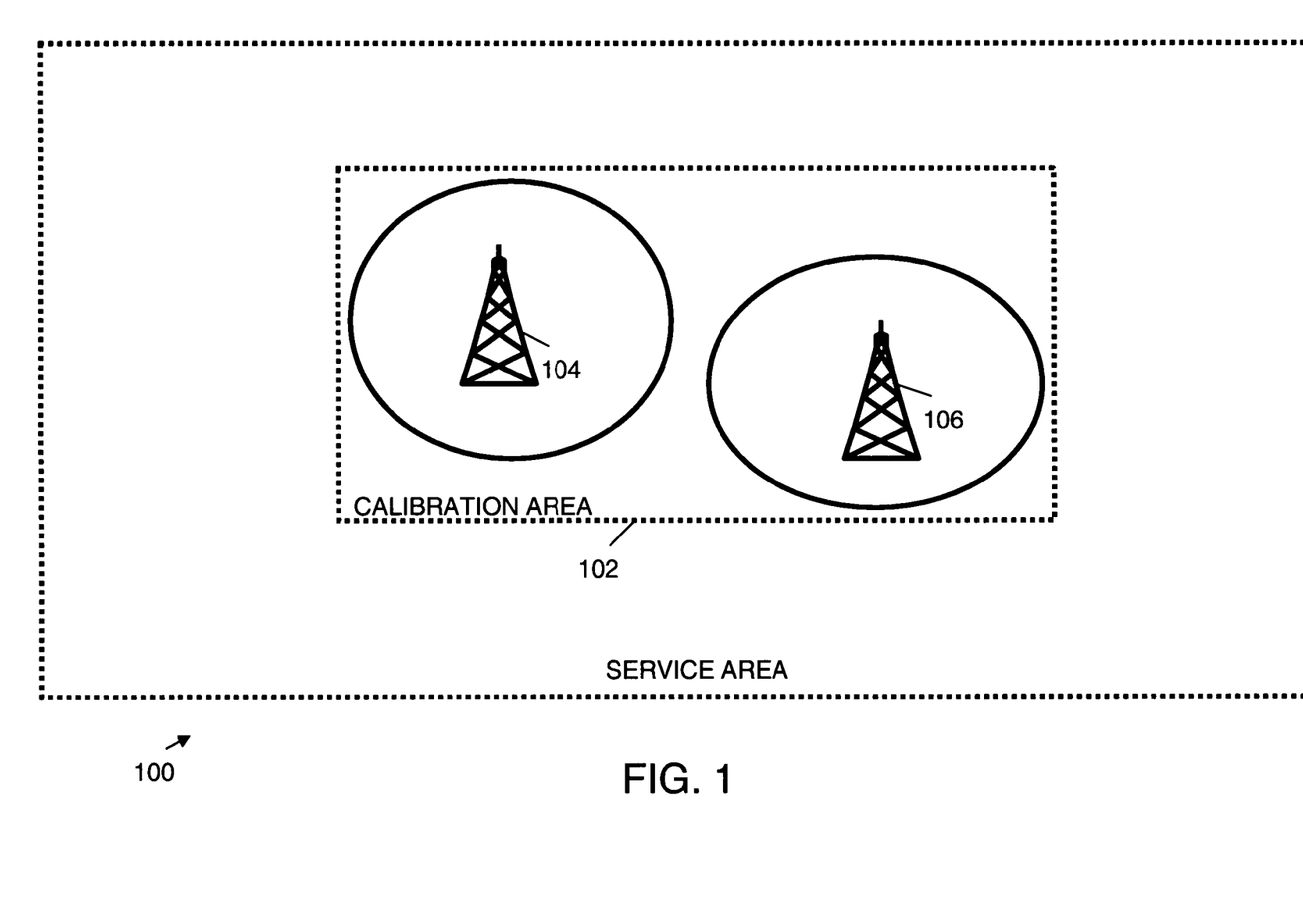
FIG. 1 is a block diagram illustrating a service area, in accordance with an exemplary embodiment of the present invention.

FIG. 1 is a block diagram illustrating a service area 100, in accordance with an exemplary embodiment of the present invention. The service area 100 may be a geographical spread, examples of which include a city, a state, and so forth. The service area 100 may be further segregated into high urban areas, urban areas, suburban areas, and rural areas, depending on factors including user distribution, forest cover, and so forth.

The service area 100 includes a calibration area 102, which is a subset of the service area 100. The calibration area 102 may be one of or an overlap of the high urban areas, the urban areas, the suburban areas, and the rural areas of the service area 100. The calibration area 102 includes a number of transceivers. For the purpose of this description, the calibration area 102 is shown to include a transceiver 104 and a transceiver 106. The presence of only two transceivers 104, 106 is not meant to be limiting and is shown for illustrative purposes.

Figure 2:
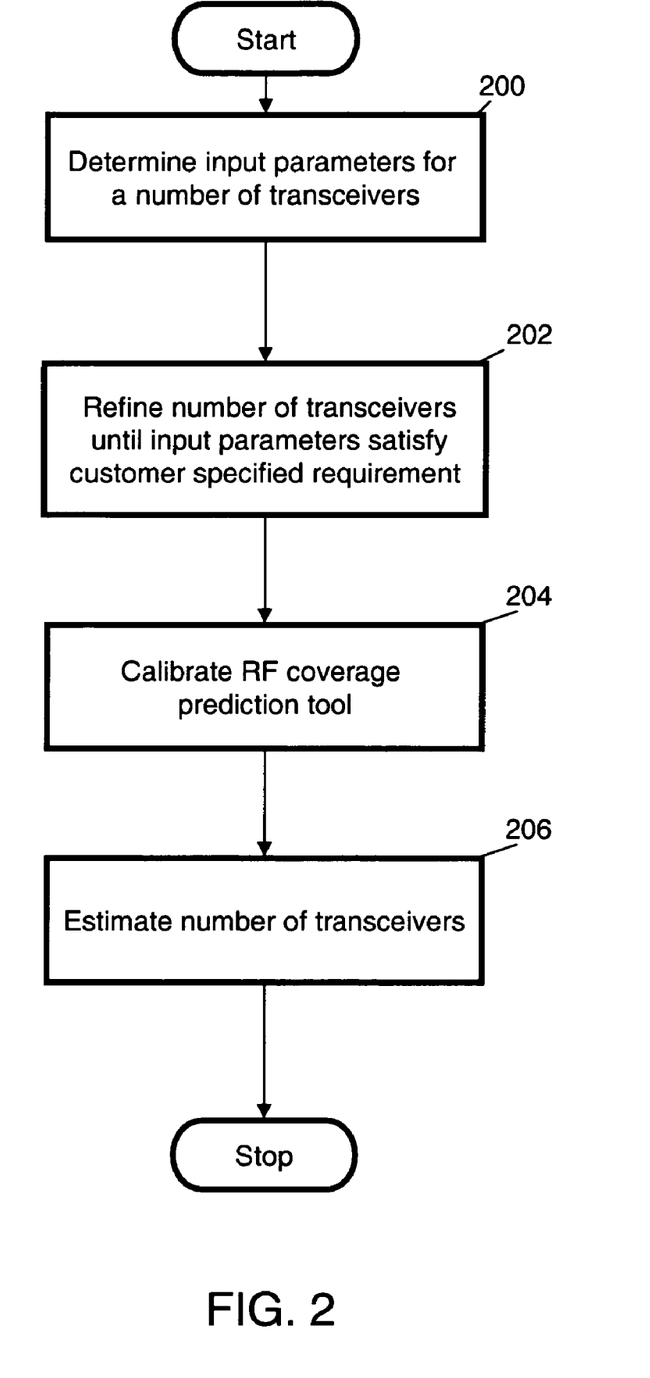
FIG. 2 is a flowchart illustrating the steps involved in estimating the number of transceivers in the service area, in accordance with an embodiment of the present invention.

FIG. 2 is a flowchart illustrating the steps involved in estimating the number of transceivers in the service area 100, in accordance with an embodiment of the present invention. At step 200, input parameters are determined for the number of transceivers in the calibration area 102. For example, input parameters are determined for the transceiver 104 and the transceiver 106 in the calibration area 102. The input parameters include at least one of a throughput, a signal strength, a path loss, and a delay spread. As used herein, the throughput is the rate at which a communication device or network can send or receive data. For example, the throughput can be quantified in terms of how many bits or bytes the communication device or network passes per second. As used herein, the signal strength is a measure of the strength of a signal. Typically, signal strength is measured as voltage per square area. Higher power requirements, such as broadcasting, use units of millivolts per square meters ($mV/m^2$). Very low-power requirements are often measured in microvolts per square meter ($\mu V/m^2$). As used herein, the path loss is the attenuation undergone by an electromagnetic wave in transit between transceivers, and is measured in dB. As used herein, the delay spread is a measure of the difference in time between the earliest and the latest direct and/or reflected radio waves to arrive at a transceiver. Delay spread is usually measured in nanoseconds (nsec) and represented by a delay spread relationship table. Further, throughput is a function of the received signal (as measured in dB) and the delay spread. In an embodiment of the present invention, the input parameters may be determined by performing field measurements or by using ray tracers. In another embodiment of the present invention, a combination of field measurements and ray tracers may be used.

At step 202, the number of transceivers in calibration area 102 is refined, so that the input parameters of the refined number of transceivers satisfy a customer-specified requirement. Refining the number of transceivers involves increasing or reducing the number of transceivers. In an embodiment of the present invention, the customer-specified requirement comprises at least one of a threshold throughput, a threshold signal strength, a threshold path loss, and a threshold delay spread for the service area 100. In another embodiment of the present invention, the customer-specified requirement comprises a coverage percentage for the service area 100. Further, the customer-specified requirement might be a combination of the above. For example, the input parameters may be required to satisfy a pre-defined coverage percentage of the service area 100 at a signal strength of more than the threshold signal strength. At step 204, a Radio Frequency (RF) coverage prediction tool is calibrated for the calibration area 102 using the determined input parameters for the refined number of transceivers. At step 206, the calibrated RF coverage prediction tool is used to estimate the number of transceivers in the service area 100.

As mentioned above, the customer-specified requirement may be a combination of, the threshold throughput, the threshold signal strength, the threshold path loss, the threshold delay spread, and the coverage percentage. Any of the above mentioned customer-specified requirements can also be considered in isolation. For example, the customer-specified requirement may be a threshold throughput of 220 kilo-bytes per second (kbps). Depending on factors such as customer requirement, and the presence of highly urban areas, urban areas, suburban areas, and rural areas, a service provider may define the coverage percentage for the service area 100. For example, the service provider decides that the customer-specified requirement is a coverage percentage of 90 percent. This means that the customer-specified requirement is a threshold throughput of 220 kbps for 90 percent of the service area 100. The customer-specified requirement is then used to refine the number of transceivers in the calibration area 102.

Figure 3:
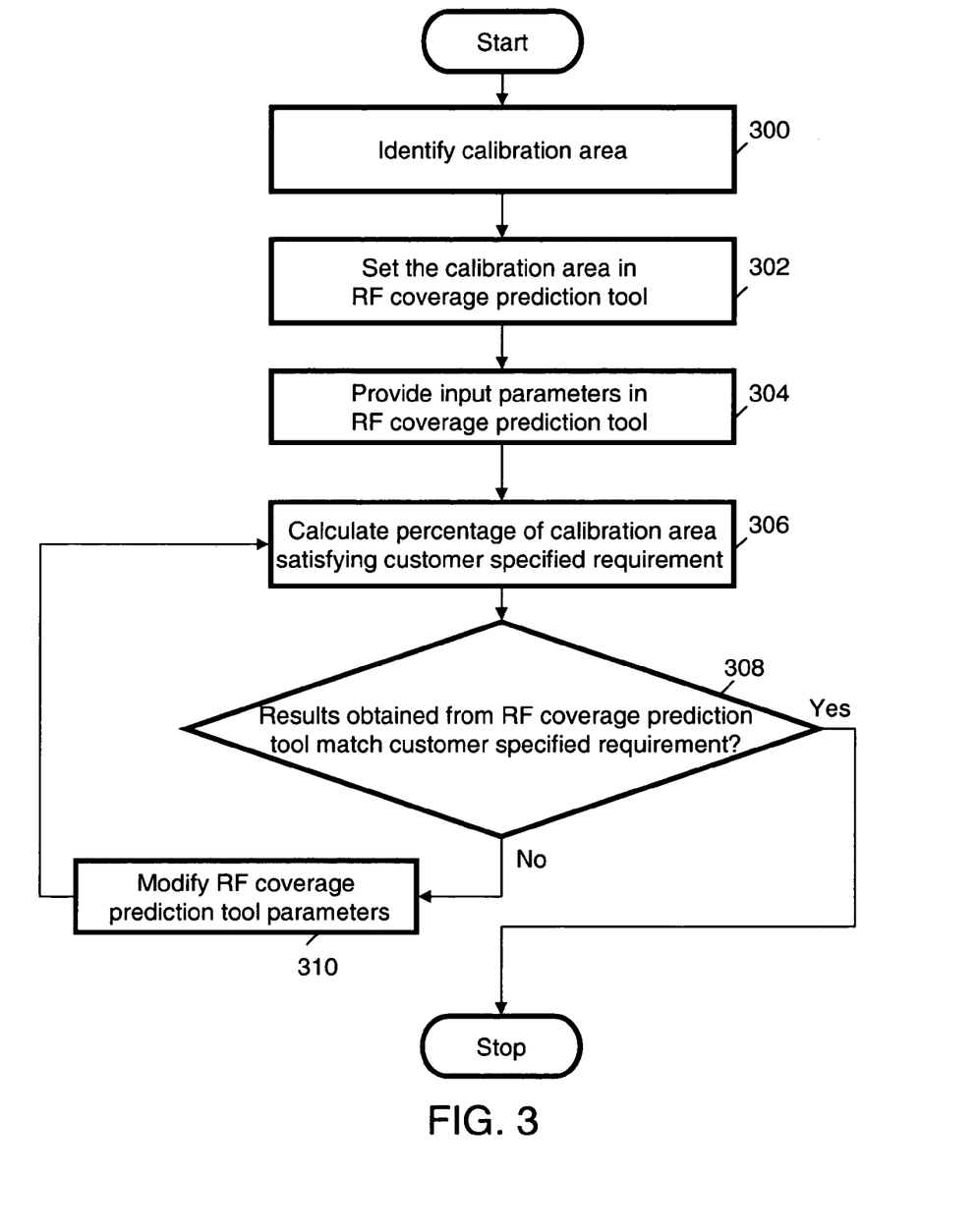
FIG. 3 is a flowchart illustrating the steps involved in the calibration of the RF coverage prediction tool, in accordance with an embodiment of the present invention.

FIG. 3 is a flowchart illustrating the steps involved in the calibration of the RF coverage prediction tool, in accordance with an embodiment of the present invention. At step 300, the calibration area 102 for calibrating the RF coverage prediction tool is identified (as described in conjunction with FIG. 1). In the calibration area 102, the refined number of transceivers satisfies the customer-specified requirement. At step 302, the identified calibration area 102 is set in the RF coverage prediction tool. At step 304, the determined input parameters for the refined number of transceivers (as described in conjunction with FIG. 2) are provided as inputs to the RF coverage prediction tool. At step 306, a percentage of the calibration area 102 satisfying the customer-specified requirement is calculated. The percentage of the calibration area 102 is calculated by using the results obtained from the RF coverage prediction tool. At step 308, a check is performed to determine if the results obtained from the RF coverage prediction tool match the determined input parameters. If the results obtained from the RF coverage prediction tool and the determined parameters do not satisfy the same customer-specified requirement, then step 310 is performed. At step 310, the RF coverage prediction tool parameters are modified. Examples of RF coverage prediction tool parameters include at least one of a type of geographical area, mean path loss, a standard deviation for the path loss, throughput to faded signal, and delay spread. In one embodiment, the type of geographical area is chosen from the list of high urban, urban, suburban, and rural. After modifying the RF coverage prediction tool parameters, step 308 is performed again. Step 310 is performed until the results obtained from the RF coverage prediction tool satisfy the customer-specified requirement.

In one example of the operation of an embodiment of the present invention, measurements are performed in the service area wherein the measurements are termed input parameters and defined above. Then, a type of geographical area is defined for the calibration wherein the area is modeled as a polygon of a type chosen from the list of high urban, urban, suburban, and rural. The geographical area represents two or more calibration areas as well as the location of transceivers for calibration. In this example, the measurements taken in the service area are utilized to derive a lognormal standard deviation for the calibration. In addition, the relationship of the throughput to faded signal and delay spread (as generally identified in a delay spread relationship table) are adjusted from the input parameters (e.g. by changing the received signal and the delay spread). Calibration continues by re-executing and iteratively adjusting an input parameter, e.g. the median path loss, with the modeled polygon, e.g. a polygon representing high urban, until a percentage of computed area coverage equaled or exceeded a customer specified requirement, e.g. a desired throughput, within each calibration. Finally, each area within the service area is identified as a geographic type and the appropriate correction factor is applied to each area within the service area.

Figure 4:
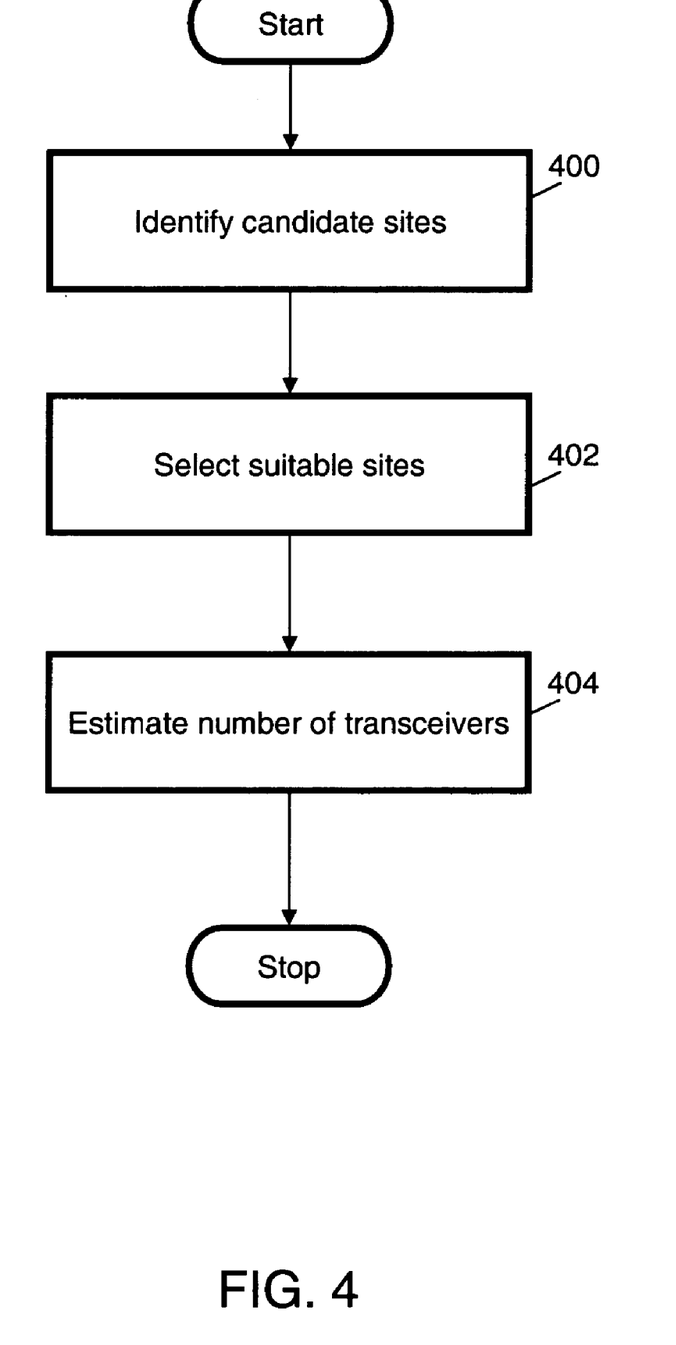
FIG. 4 is a flowchart illustrating the steps involved in estimating the number of transceivers, using a calibrated RF coverage prediction tool, in accordance with an embodiment of the present invention.

FIG. 4 is a flowchart illustrating the steps involved in estimating the number of transceivers using the calibrated RF-coverage prediction tool, in accordance with an embodiment of the present invention. At step 400, a set of candidate sites is identified in the service area 100. Examples of candidate sites include geographical locations such as buildings, towers, and so forth. At step 402, a set of suitable sites is selected from the set of candidate sites. The set of suitable sites may be selected by using an automated site selection procedure. At step 404, the set of suitable sites is used to estimate the number of transceivers in the service area 100. Each site in the set of suitable sites corresponds to a transceiver at that site, and therefore, the sites in the set of suitable sites yield the number of transceivers and the corresponding location of each transceiver.

Figure 5:
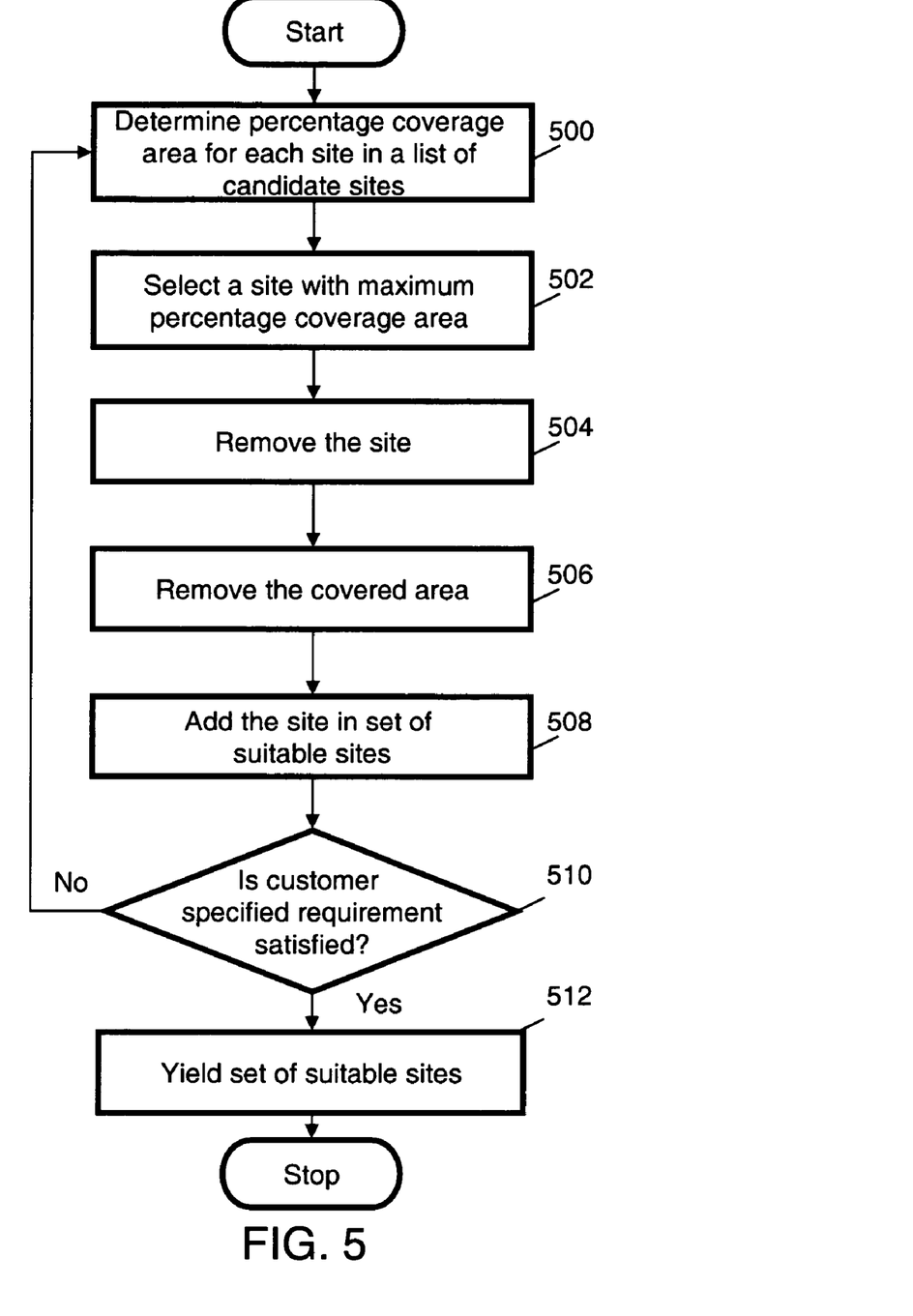
FIG. 5 is a flowchart illustrating the steps involved in executing an automated site selection procedure, in accordance with an embodiment of the invention.

FIG. 5 is a flowchart illustrating the steps involved in executing the automated site selection procedure, in accordance with an embodiment of the invention. At step 500, a percentage coverage area for each site in the set of candidate sites is determined, using the calibrated RF coverage prediction tool. At step 502, the site with the maximum percentage coverage area is selected from the set of candidate sites. At step 504, the selected site is removed from the set of candidate sites. At step 506, the corresponding covered area of the selected site is removed from the service area 100. At step 508, the selected site is added to the set of suitable sites. At step 510, a check is performed to determine if the customer-specified requirement is satisfied. If the sites in the set of suitable sites, and their corresponding input parameters, satisfy the customer-specified requirement, then step 512 is performed. At step 512, the automated site selection procedure yields the set of suitable sites, which provide the required transceivers and their respective locations in the service area 100. If the sites in the set of suitable sites, and their corresponding input parameters, do not satisfy the customer-specified requirement, then steps 500 through 510 are performed until the customer-specified requirement is satisfied.

Figure 6:
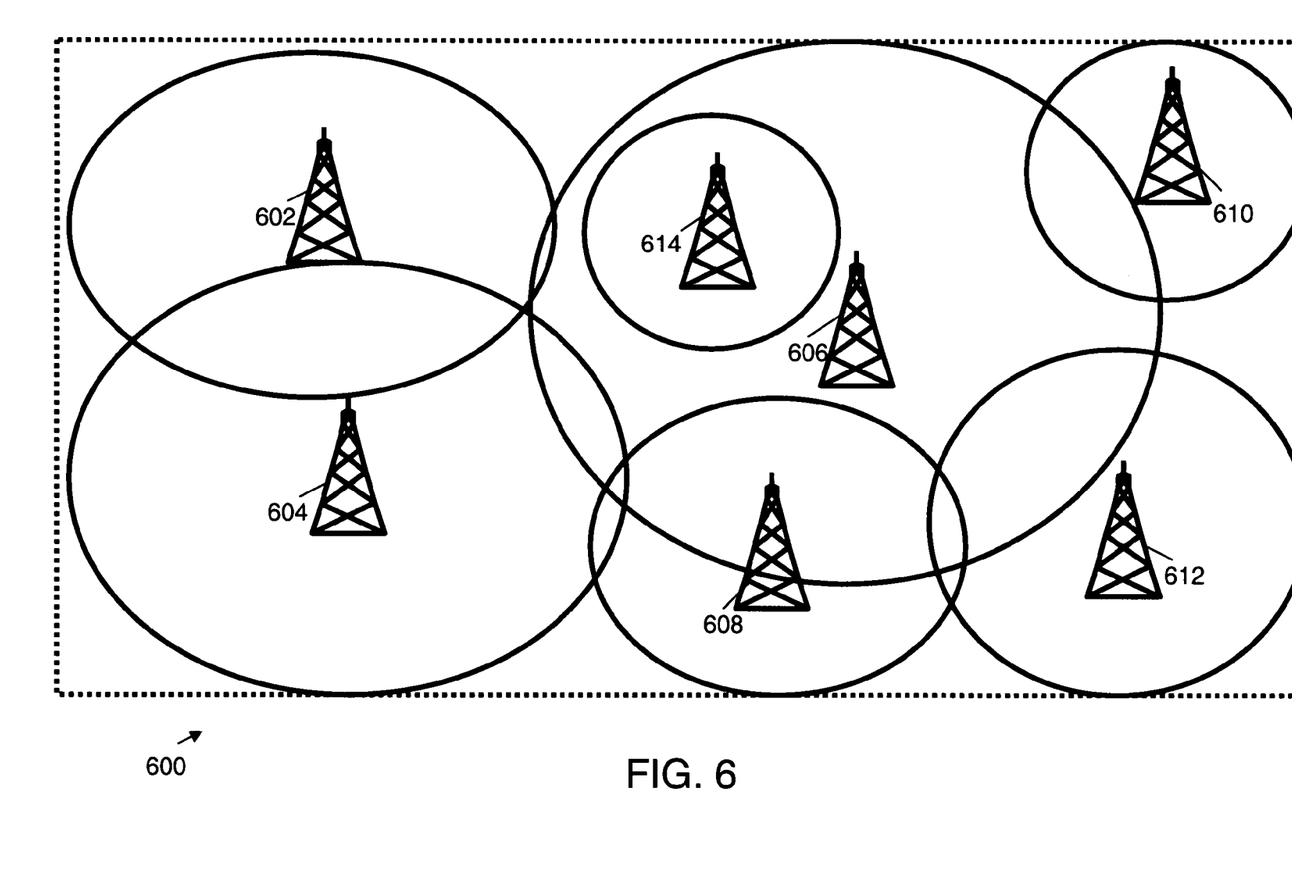
FIG. 6 is a block diagram illustrating a service area, in accordance with another embodiment of the present invention.

FIG. 6 is a block diagram illustrating a service area 600, in accordance with an embodiment of the present invention. The service area 600 is similar to the service area 100, and includes an exemplary set of candidate sites comprising candidate sites 602, 604, 606, 608, 610, 612, and 614. The automated site selection procedure, as described in conjunction with FIG. 5, selects a candidate site with the maximum percentage coverage area from the exemplary set of candidate sites, and adds the selected candidate site to the set of suitable sites. For example, the selected candidate site is the candidate site 606. In addition, the corresponding covered area of the candidate site 606 is removed from the service area 600. The set of suitable sites is selected from the set of candidate sites, and at the sites of the set of suitable sites transceivers can be located, thereby deciding the location of the transceivers. For the example of FIG. 6, the automated site selection procedure may yield a set of suitable sites comprising suitable sites 602, 604, 606, 608, 610, and 612.

Figure 7:
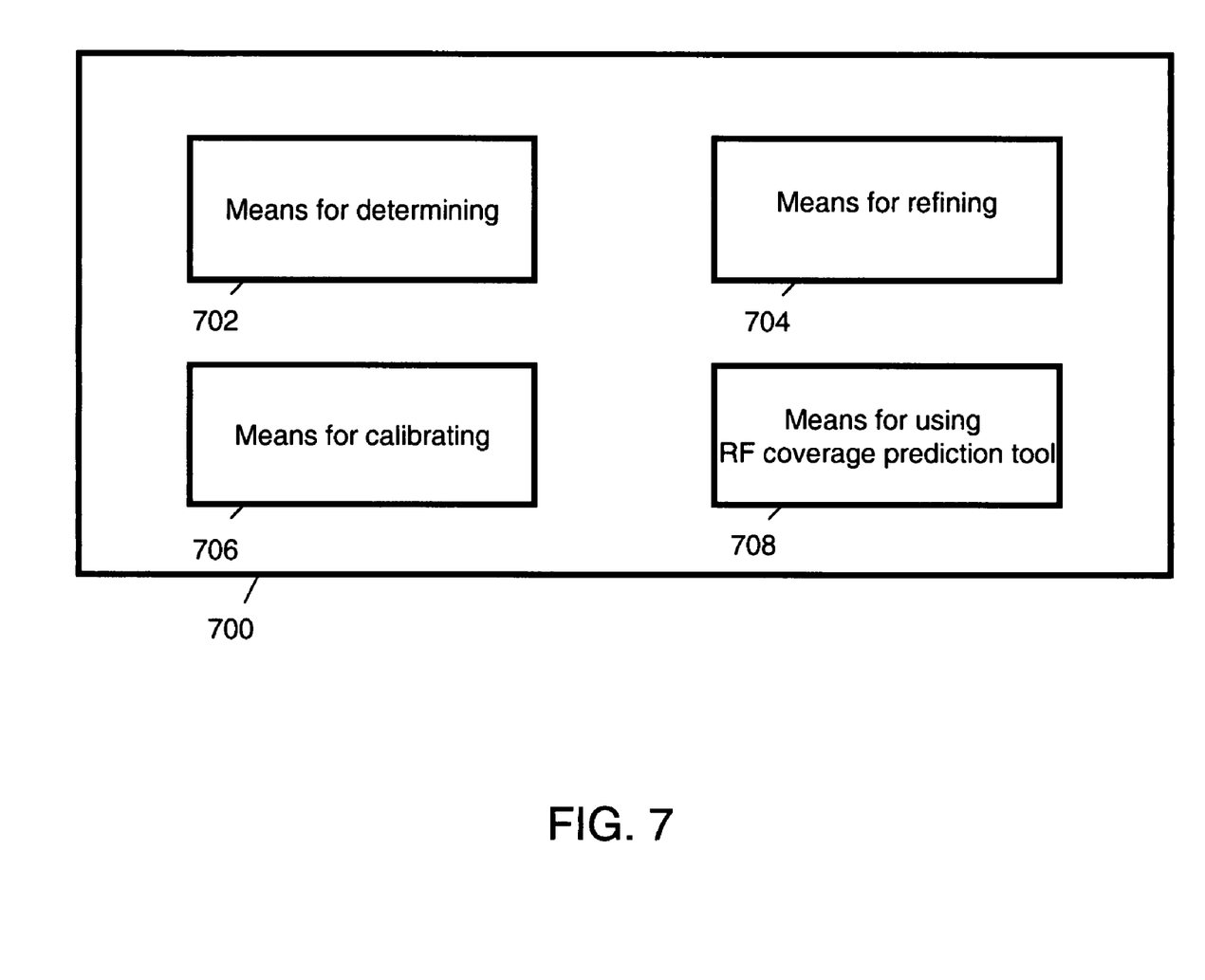
FIG. 7 is a block diagram illustrating a system for estimating the number of transceivers required in the service area, to provide required coverage, in accordance with an embodiment of the present invention.

FIG. 7 is a block diagram illustrating a system 700 for estimating the number of transceivers required in the service area 100 for providing coverage in accordance with an embodiment of the present invention. The system 700 includes a means for determining 702, a means for refining 704, a means for calibrating 706, and a means for using RF coverage prediction tool 708. The means for determining 702 determines input parameters for a number of transceivers in the calibration area 102. For example, the means for determining 702 determines the input parameters for the transceiver 104 and the transceiver 106 in the calibration area 102. The means for refining 704 refines the number of transceivers in the calibration area 102 until the input parameters of the transceivers satisfy a customer-specified requirement for the service area 100. The means for calibrating 706 calibrates a RF coverage prediction tool. The means for calibrating 706 uses the determined input parameters of the refined number of transceivers, to calibrate the RF coverage prediction tool. The means for using RF coverage prediction tool 708 uses the calibrated RF coverage prediction tool to estimate the number of transceivers in the service area 100.

Figure 8:
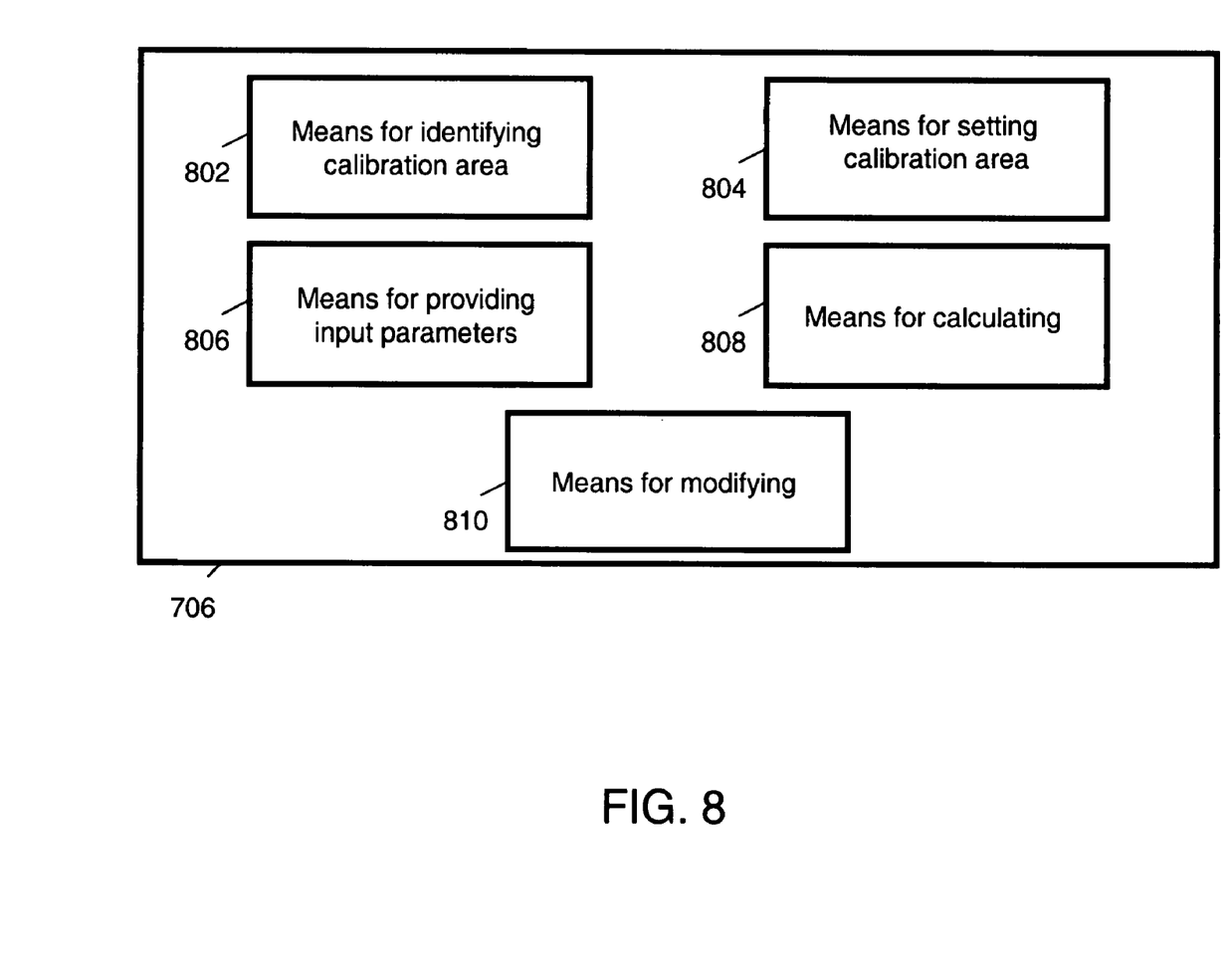
FIG. 8 is a block diagram illustrating the components of a means for calibrating.

FIG. 8 is a block diagram illustrating the components of the means for calibrating 706. The means for calibrating 706 includes a means for identifying calibration area 802, a means for setting calibration area 804, a means for providing input parameters 806, a means for calculating 808, and a means for modifying 810. The means for identifying calibration area 802 identifies a calibration area within the service area 100. For example, the means for identifying the calibration area 802 identifies the calibration area 102 in the service area 100. The calibration area 102 includes the refined number of transceivers satisfying the customer-specified requirement. The means for setting calibration area 804 sets the calibration area 102 in the RF coverage prediction tool. The means for providing input parameters 806 provides the determined input parameters for the refined number of transceivers in the RF coverage prediction tool. The means for calculating 808 calculates a percentage of the calibration area 102 that satisfies the customer-specified requirement. This is carried out, based on the results obtained by using the RF coverage prediction tool. The means for modifying 810 modifies one or more of the RF coverage prediction tool parameters. RF coverage prediction tool parameters are modified so that the results obtained from the RF coverage prediction tool and the determined input parameters satisfy the same customer-specified requirement.

Figure 9:
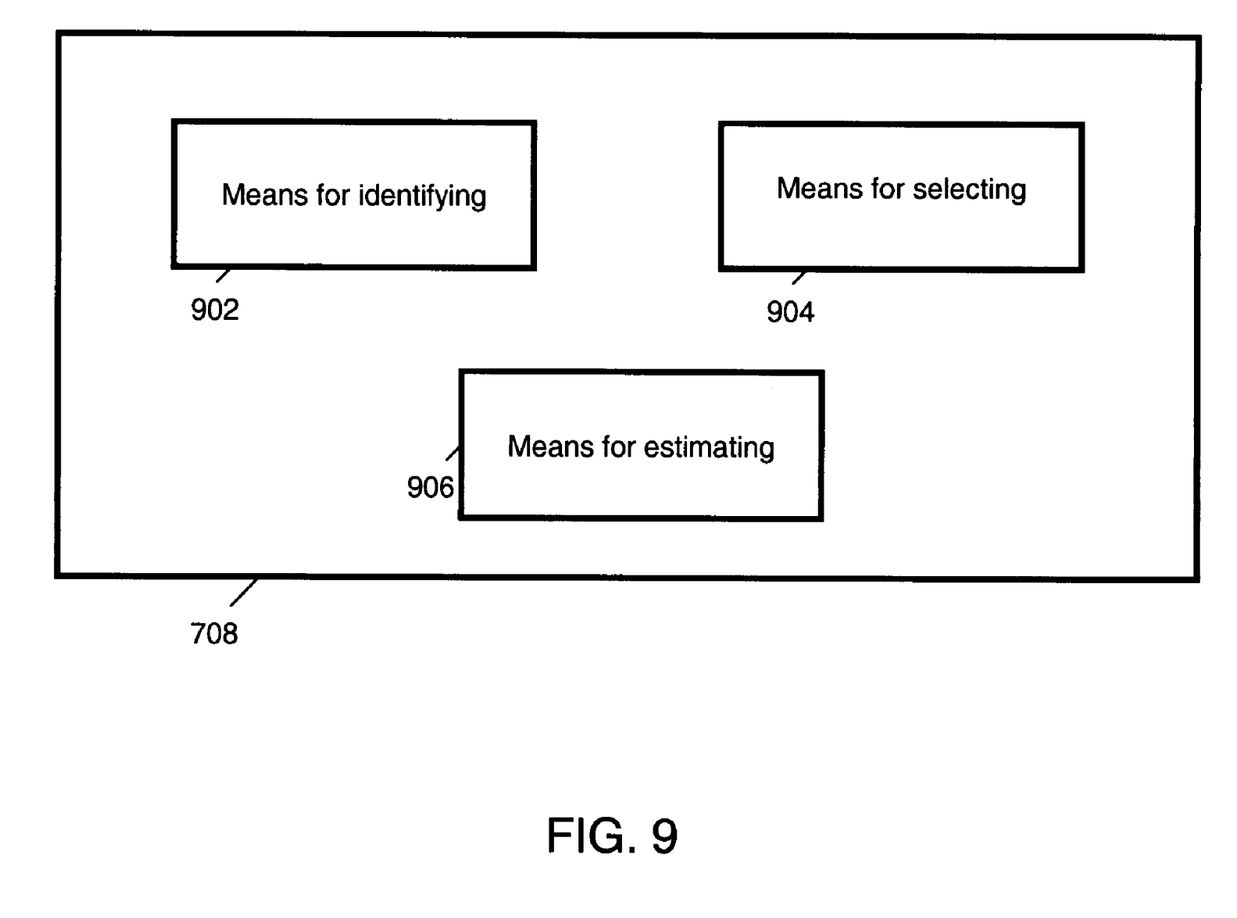
FIG. 9 is a block diagram illustrating the components of a means for using RF coverage prediction tool.

FIG. 9 is a block diagram illustrating the components of the means for using RF coverage prediction tool 708. The means for using RF coverage prediction tool 708 includes a means for identifying 902, a means for selecting 904, and a means for estimating 906. The means for identifying 902 identifies a set of candidate sites in the service area 100. For example, the means for identifying 902 identifies the candidate sites 602, 604, 606, 608, 610, and 612 in the service area 600 (as described in conjunction with FIG. 6). The means for selecting 904 selects a set of suitable sites from the set of candidate sites. The sites in the set of suitable sites are selected, so as to satisfy the customer-specified requirement. For example, the set of suitable sites may be required to satisfy a pre-defined coverage percentage of the service area 100, at a signal strength of more than the threshold signal strength. The means for estimating 906 estimates the number of transceivers in the service area 100, based on the set of suitable sites.

Figure 10:
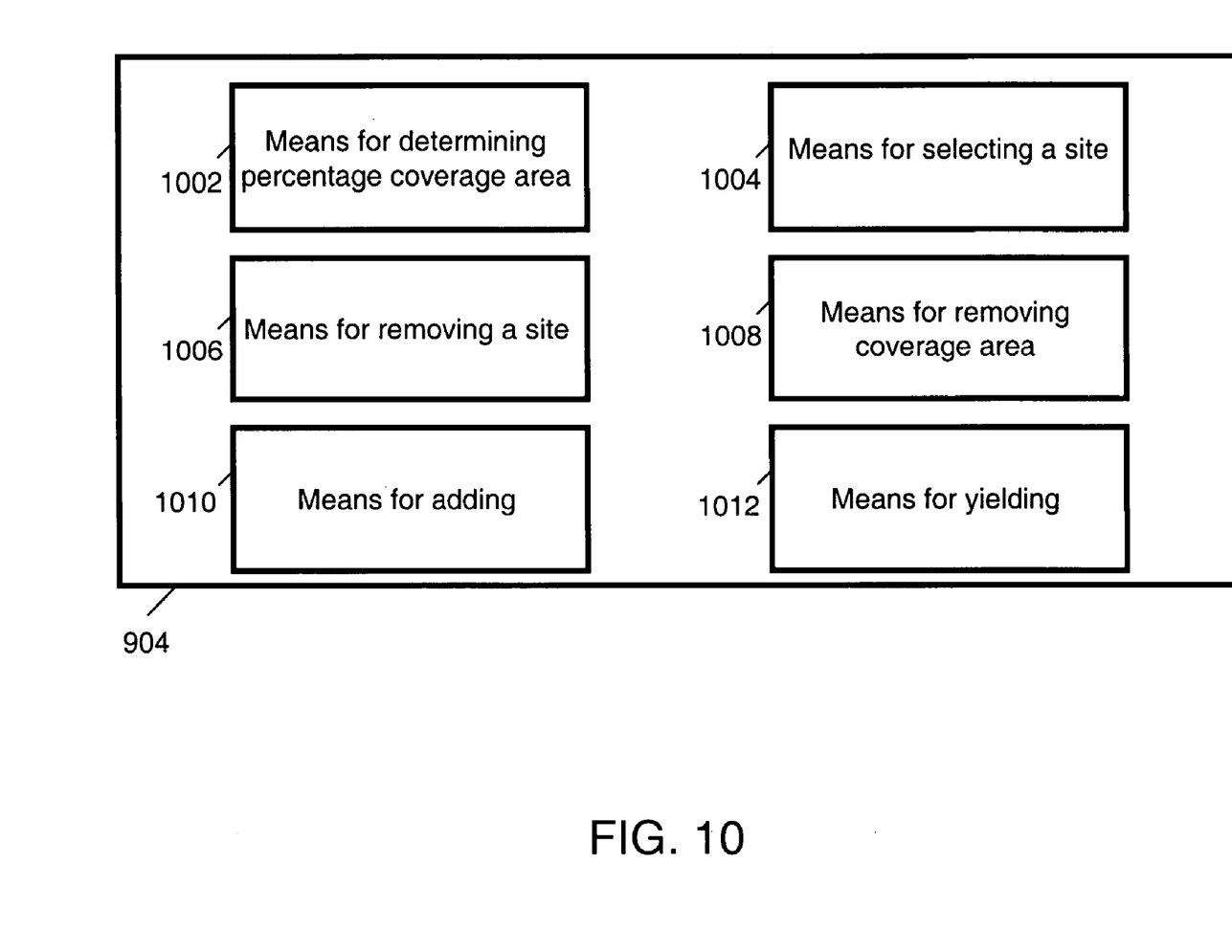
FIG. 10 is a block diagram illustrating the components of a means for selecting.

FIG. 10 is a block diagram illustrating the components of the means for selecting 904. The means for selecting 904 includes a means for determining percentage coverage area 1002, a means for selecting a site 1004, a means for removing a site 1006, a means for removing coverage area 1008, a means for adding 1010, and a means for yielding 1012. The means for determining percentage coverage area 1002 determines the percentage coverage area of each site in the set of candidate sites. The means for selecting a site 1004 selects the site with the maximum percentage coverage area in an uncovered area of the service area 100 from the set of candidate sites. The means for removing a site 1006 removes the selected site from the set of candidate sites. The means for removing covered area 1008 removes the corresponding covered area of the selected site from the service area 100. The means for adding 1010 adds the selected site in the set of suitable sites. The means for yielding 1012 yields the set of suitable sites. The means for yielding 1012 yields the set of suitable sites when the customer-specified requirement for the service area 100 is satisfied.

Therefore, it should be clear from the preceding disclosure that the present invention provides a method and system for estimating the number of transceivers in a service area, which simplifies the complexity involved in estimating the number of transceivers, thereby reducing the cost of the estimation. Moreover, the disclosed invention is accurate in its estimation of the transceivers.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of estimating the number of transceivers in a service area for providing coverage, the method comprising:

determining input parameters for a number of transceivers in a calibration area, wherein the calibration area is a subset of the service area;

refining the number of transceivers in the calibration area until the determined input parameters satisfies a customer specified requirement for the service area;

calibrating a Radio Frequency (RF) coverage prediction tool using the determined input parameters for the refined number of transceivers; and using the calibrated RF coverage prediction tool for estimating the number of transceivers in the service area.

2. The method of claim 1, wherein the input parameters comprise at least one of a throughput, a signal strength, a path loss, and a delay spread.

3. The method of claim 1, wherein the customer specified requirement comprises at least one of a threshold throughput, a threshold signal strength, a threshold path loss, and a threshold delay spread for the service area.

4. The method of claim 1, wherein the customer specified requirement comprises a coverage percentage for the service area.

5. The method according to claim 1, wherein calibrating the RF coverage prediction tool comprises:

identifying a calibration area where the refined number of transceivers satisfy a customer specified requirement;

setting the calibration area in the RF coverage prediction tool;

providing the determined input parameters for the refined number of transceivers in the RF coverage prediction tool;

calculating a percentage of the calibration area satisfying the customer specified requirement from results obtained using the RF coverage prediction tool; and modifying one or more of RF coverage prediction tool parameters such that the results obtained from the RF coverage prediction tool and the determined input parameters satisfy the same customer specified requirement.

6. The method according to claim 5, wherein the calibration area is of a geographic type chosen from the list of high urban, urban, suburban, and rural.

7. The method according to claim 5, wherein the one or more of the RF coverage prediction tool parameters comprises at least one of a mean path loss, a standard deviation for the path loss, a ratio of throughput to faded signal, and delay spread.

8. The method according to claim 1, wherein estimating the number of transceivers in the service area using the calibrated RF coverage prediction tool comprises:

identifying a set of candidate sites in the service area;

selecting a set of suitable sites from the set of candidate sites, wherein the set of suitable sites satisfies the customer specified requirement for the service area; and estimating the number of transceivers in the service area based on the set of suitable sites.

9. The method according to claim 8, wherein selecting the set of suitable sites comprises executing an automated site selection procedure.

10. The method according to claim 9, wherein executing the automated site selection procedure comprises iteratively performing the following until the customer specified requirement for the service area is met:

determining a percentage coverage area for each site in the set of candidate sites;

selecting a site having maximum percentage coverage area from the set of candidate sites;

removing the site from the set of candidate sites;

removing a covered area of the site from the service area, wherein the covered area corresponds to the percentage coverage area for each site;

adding the site in the set of suitable sites; and yielding the set of suitable sites if the customer specified requirement for the service area is satisfied.

11. The method according to claim 1, wherein estimating the number of transceivers is determining a location of each transceiver in the service area.

12. The method according to claim 1, wherein determining the one or more input parameters comprises at least one of using ray tracers and performing field measurements.

13. A system suitable for estimating the number of transceivers required in a service area for providing coverage, the system comprising:

means for determining input parameters for a number of transceivers in a calibration area, wherein the calibration area is a subset of the service area;

means for refining the number of transceivers in the calibration area until the determined input parameters satisfies a customer specified requirement for the service area;

means for calibrating a Radio Frequency (RF) coverage prediction tool using the determined input parameters for the refined number of transceivers; and means for using the calibrated RF coverage prediction tool for estimating the number of transceivers in the service area.

14. The system according to claim 13, wherein the means for calibrating the RF coverage prediction tool comprises:

means for identifying a calibration area where the refined number of transceivers satisfy the customer specified requirement;

means for setting the calibration area in the RF coverage prediction tool;

means for providing the determined input parameters for the refined number of transceivers in the RF coverage prediction tool;

means for calculating a percentage of the calibration area satisfying the customer specified requirement from results obtained using the RF coverage prediction tool; and means for modifying one or more of RF coverage prediction tool parameters such that the results obtained from the RF coverage prediction tool and the determined input parameters satisfy the same customer specified requirement.

15. The system according to claim 13, wherein the means for using the RF coverage prediction tool for estimating the number of transceivers comprises:

means for identifying a set of candidate sites in the service area;

means for selecting a set of suitable sites from the set of candidate sites, wherein the set of suitable sites satisfies the customer specified requirement for the service area; and means for estimating the number of transceivers in the service area based on the set of suitable sites.

16. The system according to claim 15, wherein the means for selecting the set of suitable sites comprises:

means for determining percentage coverage area of each site in the set of candidate sites;

means for selecting a site having maximum percentage coverage area from the set of candidate sites;

means for removing the site from the set of candidate sites;

means for removing a covered area of the site from the service area;

means for adding the site in the set of suitable sites; and means for yielding the set of suitable sites if the customer specified requirement for the service area has been satisfied.

17. The system according to claim 13, wherein the calibration area is of a geographic type chosen from the list of high urban, urban, suburban, and rural.

* * * * *